US012650325B2

(12) United States Patent
Yamashita et al.

(10) Patent No.: US 12,650,325 B2
(45) Date of Patent: Jun. 9, 2026

(54) CLAMP-ON TYPE ULTRASONIC FLOWMETER

(71) Applicant: FUJI ELECTRIC CO., LTD., Kawasaki (JP)

(72) Inventors: Shiori Yamashita, Asaka-city (JP); Takuya Shibasaki, Ootsuki-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 291 days.

(21) Appl. No.: 18/497,385

(22) Filed: Oct. 30, 2023

(65) Prior Publication Data

US 2024/0210223 A1 Jun. 27, 2024

(30) Foreign Application Priority Data

Dec. 23, 2022 (JP) ................................. 2022-206239

(51) Int. Cl.
 *G01F 1/66* (2022.01)
 *G01F 1/667* (2022.01)
(52) U.S. Cl.
 CPC .............. *G01F 1/662* (2013.01); *G01F 1/667* (2013.01)
(58) Field of Classification Search
 CPC ................................. G01F 1/662; G01F 1/667

USPC ....................................................... 73/861.28
See application file for complete search history.

(56) References Cited

U.S. PATENT DOCUMENTS

| | | | | |
|---|---|---|---|---|
| 4,454,767 | A * | 6/1984 | Shinkai ................... | G01F 1/662 |
| | | | | 73/861.28 |
| 9,671,264 | B2 | 6/2017 | Kashima | |
| 2016/0334252 | A1* | 11/2016 | Kashima ................. | G01F 1/667 |
| 2023/0384075 | A1* | 11/2023 | Chang ..................... | G01F 1/662 |

FOREIGN PATENT DOCUMENTS

| | | |
|---|---|---|
| CN | 114440995 A | 5/2022 |
| JP | 2021-015090 A | 2/2021 |

OTHER PUBLICATIONS

Taiwanese Office Action for Taiwanese Application No. 112140794 mailed on Mar. 24, 2025; 7 pp.

* cited by examiner

*Primary Examiner* — Nathaniel T Woodward
(74) *Attorney, Agent, or Firm* — HAUPTMAN HAM, LLP

(57) ABSTRACT

A clamp-on type ultrasonic flowmeter that uses ultrasonic waves for measuring a flow rate of a fluid flowing inside a piping, includes an acoustic coupler rubber with a flat-plate structure, which is attached to an ultrasonic transmission-reception surface of an ultrasonic transducer that transmits ultrasonic waves to and receives ultrasonic waves from the piping.

3 Claims, 8 Drawing Sheets

CLAMP-ON TYPE ULTRASONIC FLOWMETER

CROSS-REFERENCE TO RELATED APPLICATION(S)

The present application claims priority to and incorporates by reference the entire contents of Japanese Patent Application No. 2022-206239 filed in Japan on Dec. 23, 2022.

BACKGROUND

The present disclosure relates to a clamp-on type ultrasonic flowmeter.

In the related art, an ultrasonic flowmeter is known that uses ultrasonic waves for measuring the flow rate of a fluid flowing inside a piping. In such an ultrasonic flowmeter, transmission and reception of ultrasonic waves is performed between a piezoelectric device disposed on the upstream side of the piping and a piezoelectric device disposed on the downstream side of the piping, and the flow rate of the fluid flowing inside the piping is measured from the difference in the propagation time of the ultrasonic waves.

As far as such an ultrasonic flowmeter is concerned, a diagonal-incident-angle type ultrasonic flowmeter is known (for example, refer to Japanese Patent Application Laid-open No. 2021-15090). In a diagonal-incident-angle type ultrasonic flowmeter, transmission and reception of ultrasonic waves is performed at an angle with respect to the piping and is performed between a single compact piezoelectric device disposed on the upstream side of a piping and a single compact piezoelectric device disposed on the downstream side of the piping; and the flow rate of the fluid flowing inside the piping is measured from the difference in the propagation time of the ultrasonic waves. In a diagonal-incident-angle type ultrasonic flowmeter, piezoelectric devices are attachable to the piping according to the clamp-on method. In the clamp-on method, piezoelectric devices can be attached to an existing piping without having to cut the piping.

SUMMARY

There is a need for providing a clamp-on type ultrasonic flowmeter in which such an acoustic coupler rubber is disposed which enables maintaining excellent acoustic properties and at the same time enables holding down the molding cost.

According to an embodiment, a clamp-on type ultrasonic flowmeter, using ultrasonic waves for measuring a flow rate of a fluid flowing inside a piping, includes an acoustic coupler rubber with a flat-plate structure, which is attached to an ultrasonic transmission-reception surface of an ultrasonic transducer that transmits ultrasonic waves to and receives ultrasonic waves from the piping.

DETAILED DESCRIPTION

In a clamp-on type ultrasonic flowmeter in the related art, at the time when an ultrasonic transducer transmits and receives ultrasonic waves, it is abutted against the piping through which the target fluid for measurement is flowing. Thus, in order to ensure acoustic coupling between the surface of the piping and the acoustic radiation surface of the ultrasonic transducer, an acoustic coupler such as an elastic rubber (hereinafter, called an "acoustic coupler rubber") is disposed.

A related-art acoustic coupler rubber has a three-dimensional structure covering the wedges of the ultrasonic transducers. Herein, as far as molding of an acoustic coupler rubber is concerned, not only it requires using a mold thereby involving a molding cost, but it is also difficult to control the surface roughness and the vulcanization condition of the acoustic coupler rubber thereby resulting in a decline in the acoustical properties.

An exemplary embodiment of a clamp-on type ultrasonic flowmeter according to the present disclosure is described in detail with reference to the accompanying drawings. However, the present disclosure is not limited by the embodiment described below.

Overall Configuration

Figure 1:
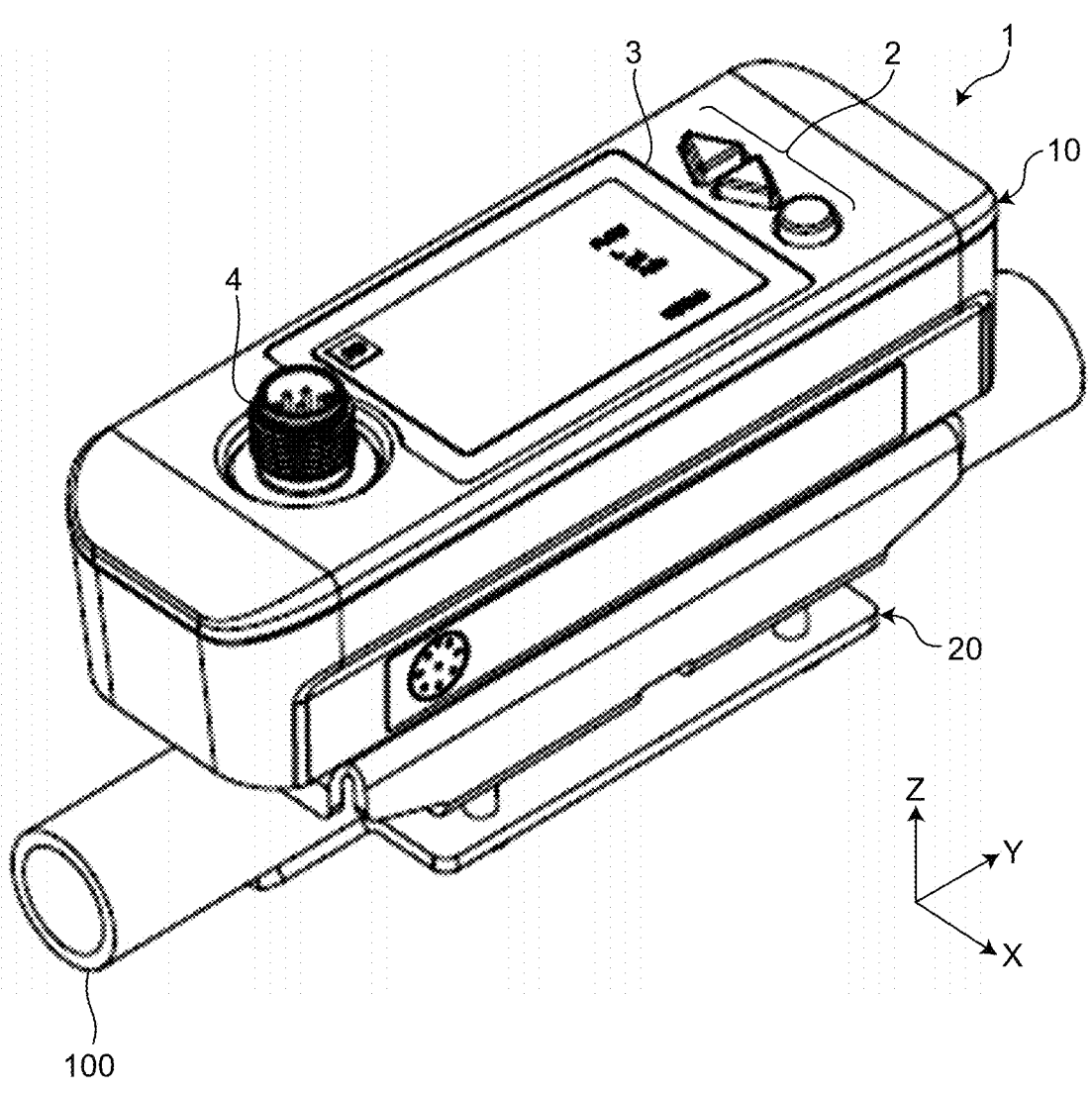
FIG. 1 is a perspective view of a clamp-on type ultrasonic flowmeter according to an embodiment of the present disclosure.
Figure 2:
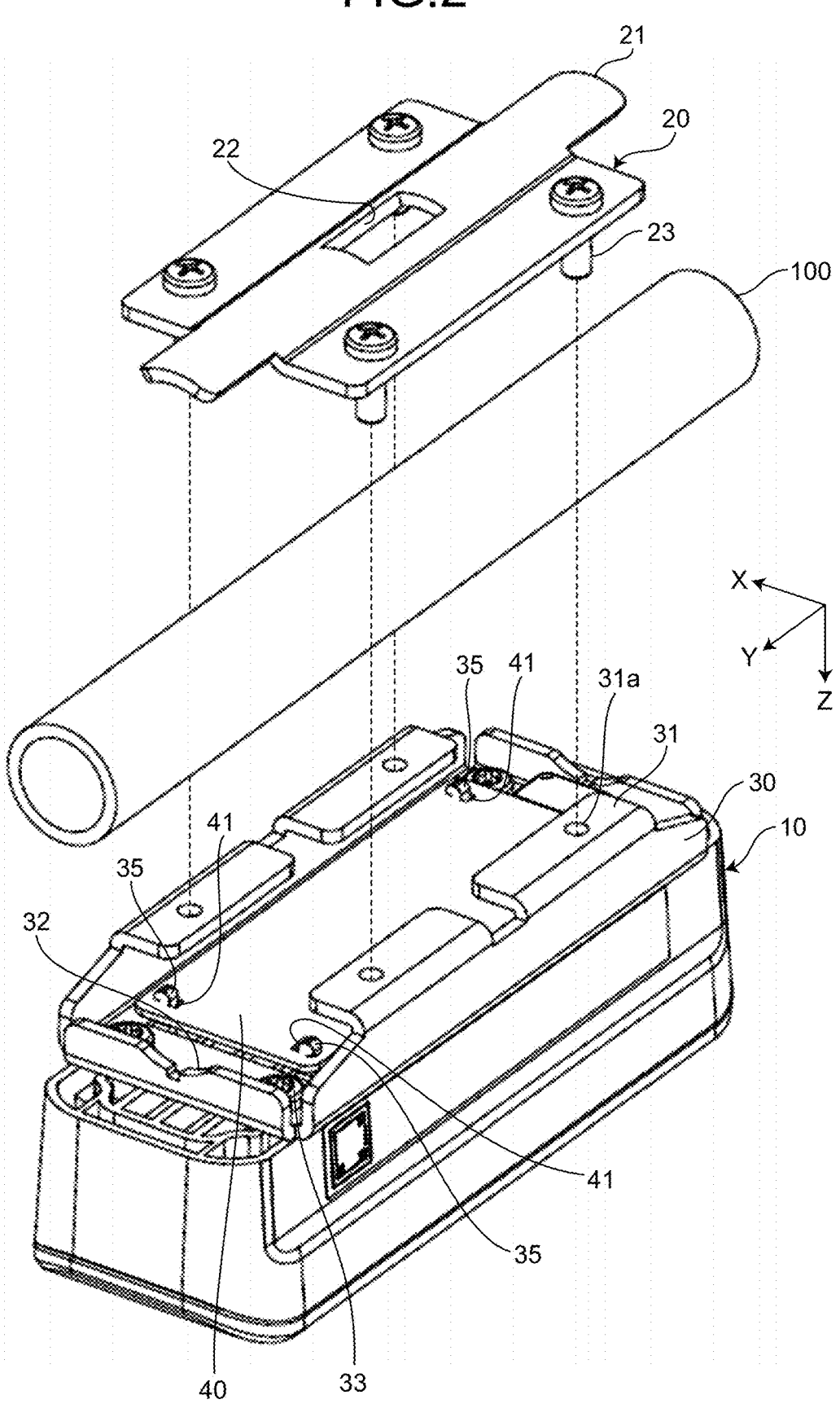
FIG. 2 is an exploded perspective view of the clamp-on type ultrasonic flowmeter illustrated in FIG. 1.
Figure 3:
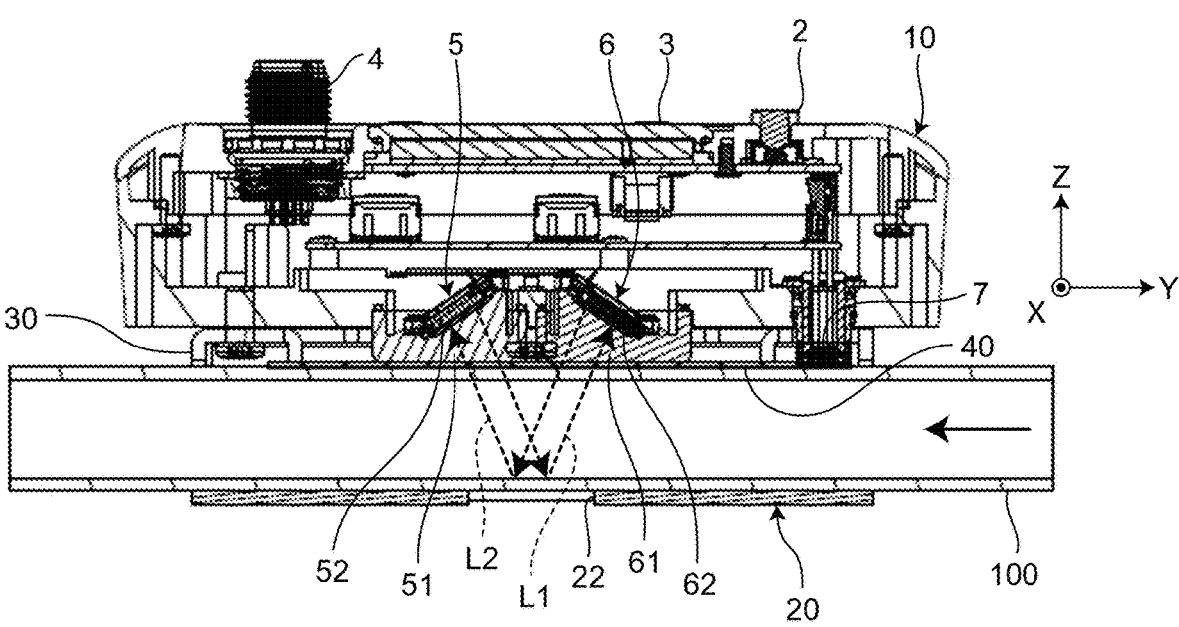
FIG. 3 is vertical cross-sectional view of the clamp-on type ultrasonic flowmeter illustrated in FIG. 1.

FIG. 1 is a perspective view of a clamp-on type ultrasonic flowmeter 1 according to the embodiment of the present disclosure. FIG. 2 is an exploded perspective view of the clamp-on type ultrasonic flowmeter 1 illustrated in FIG. 1. FIG. 3 is vertical cross-sectional view of the clamp-on type ultrasonic flowmeter 1 illustrated in FIG. 1. As illustrated in FIGS. 1 to 3, the clamp-on type ultrasonic flowmeter 1 includes a main-body-side piping attachment portion 30 mounted on a device main body 10 and includes an outer-side piping attachment portion 20; is clamped to a piping 100, through which a fluid flows, from both sides using the main-body-side piping attachment portion 30 and the outer-side piping attachment portion 20; and measures the flow rate of the fluid flowing through the piping 100.

The clamp-on type ultrasonic flowmeter 1 includes ultrasonic transducers 5 and 6 that are placed opposite to each other, that transmit ultrasonic signals to the fluid flowing in the piping 100, and that receive ultrasonic signals coming from the fluid flowing in the piping 100. On a tilted surface of a wedge 51 of the ultrasonic transducer 5, a piezoelectric device 52 is attached. Similarly, on a tilted surface of a wedge 61 of the ultrasonic transducer 6, a piezoelectric device 62 is attached. Thus, from the undersurface of the wedges 51 and 61 and via an acoustic coupler rubber 40, the ultrasonic transducers 5 and 6 transmit ultrasonic signals to and receive ultrasonic signals from the piping 100 at an angle.

As far as the flow rate measurement performed by the clamp-on type ultrasonic flowmeter 1 is concerned, when the clamp-on type ultrasonic flowmeter 1 is clamped to the piping 100; for example, an ultrasonic signal L1 is transmitted from the ultrasonic transducer 5; the ultrasonic signal L1 that has returned from the piping 100 because of reflection is received by the ultrasonic transducer 6; and the propagation time of the ultrasonic signal L1 is measured. Moreover, an ultrasonic signal L2 is transmitted from the ultrasonic transducer 6; the ultrasonic signal L2 that has returned from the piping 100 because of reflection is received by the ultrasonic transducer 5; and the propagation time of the ultrasonic signal L2 is measured. Based on the propagation time of each of the ultrasonic signals L1 and L2, the flow velocity of the fluid is calculated and the flow rate per unit time is obtained. Meanwhile, the flow rate can also be obtained in the form of the cumulative flow rate. At that time, using a temperature measuring unit 7 attached to the device main body 10, the temperature of the fluid is measured via the piping 100, and temperature correction for the flow velocity is performed accordingly. Meanwhile, the setting is such that the ultrasonic signals L1 and L2 pass through the axis of the piping 100.

The device main body 10 includes an operating unit 2, a display unit 3, and a cable connection unit 4. Moreover, a control unit (not illustrated) is also included in the device main body 10. The operating unit 2 is an input interface that enables input of a variety of information and receives input of information in response to selection of preset information. The display unit 3 is an output interface that enables output of a variety of information and, for example, is used to display the flow rate [liter/min], the cumulative flow rate [liter], and the status [normal/malfunction]. The cable connection unit 4 is a connector for establishing connection with an external power supply line and with a cable including a signal line to an external device. In response to an instruction received from the operating unit 2, the control unit performs transmission-reception control of the ultrasonic transducers 5 and 6; calculates the flow velocity based on the difference in the propagation time and based on the temperature measured by the temperature measuring unit 7; displays the result and the state in the display unit 3; and outputs the result and the state to the outside via the cable connection unit 4.

Acoustic Coupler Rubber

Figure 4:
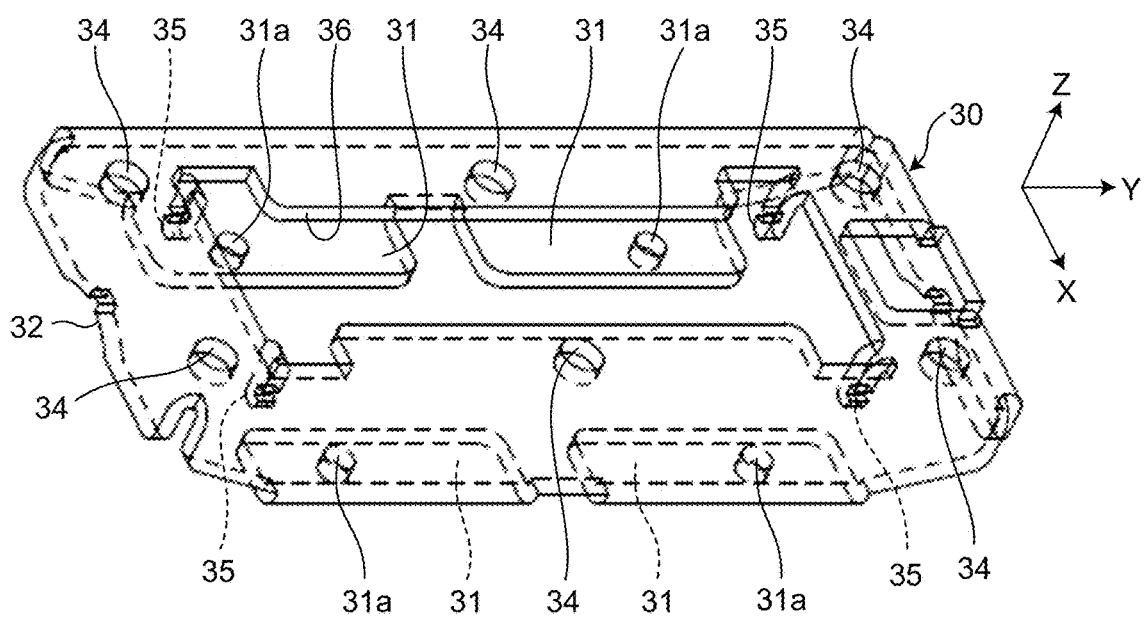
FIG. 4 is a perspective view of a main-body-side piping attachment portion when viewed from below in an oblique direction.
Figure 5:
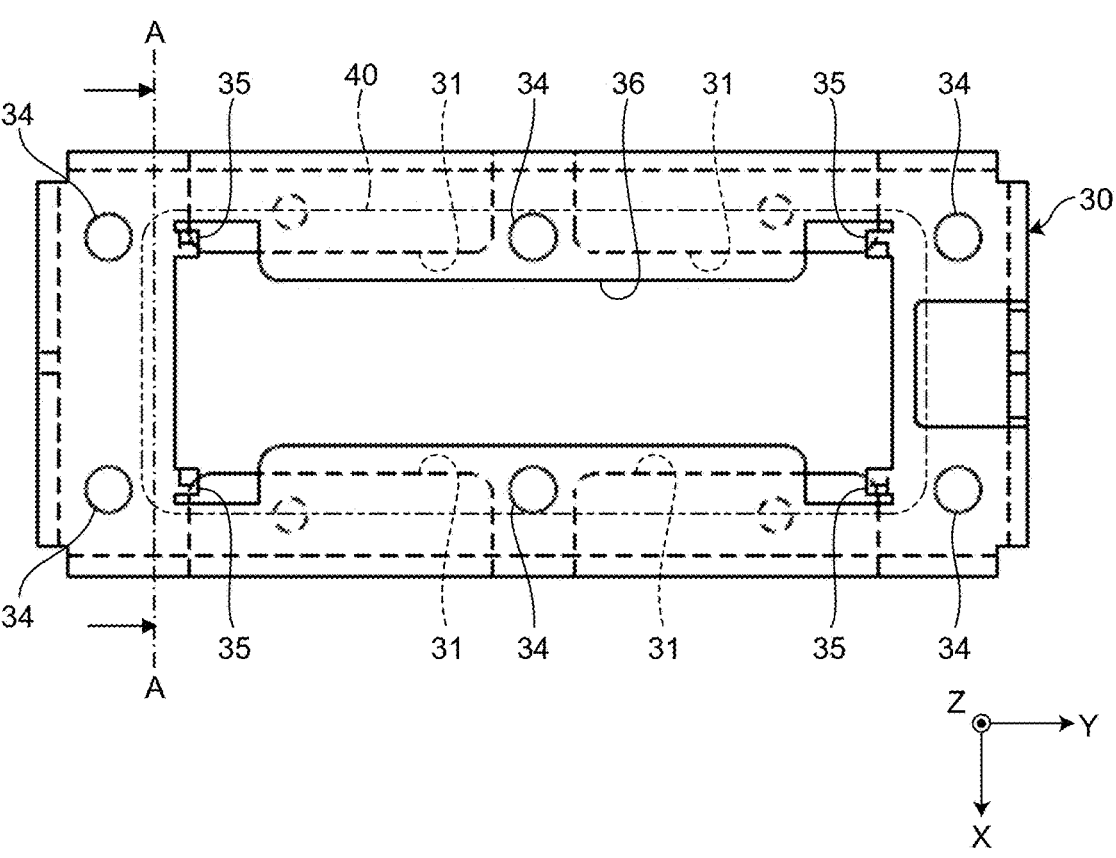
FIG. 5 is a planar view of the main-body-side piping attachment portion.
Figure 6:
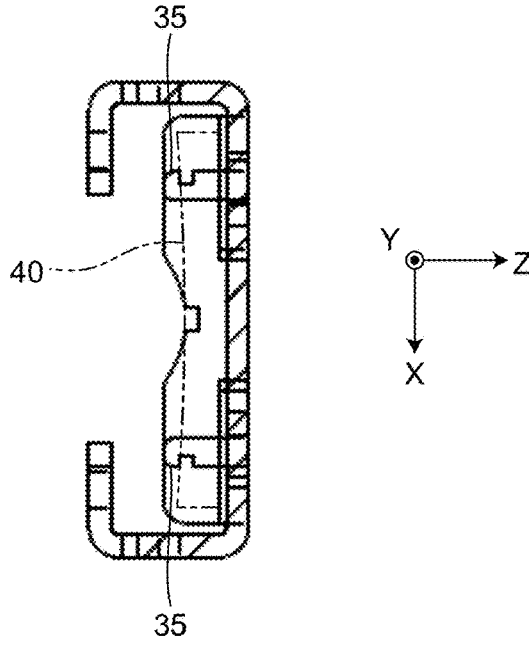
FIG. 6 is a cross-sectional view along an A-A line of the main-body-side piping attachment portion illustrated in FIG. 5.
Figure 7:
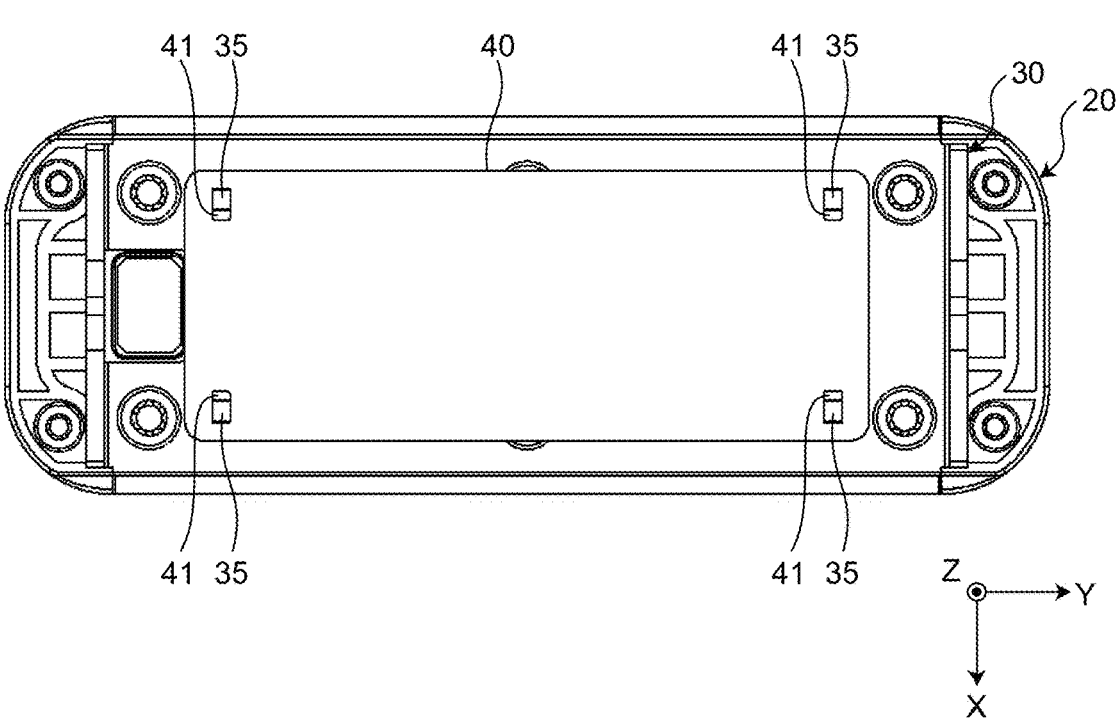
FIG. 7 is a diagram illustrating the state in which an acoustic coupler rubber is attached to the main-body-side piping attachment portion.

FIG. 4 is a perspective view of the main-body-side piping attachment portion 30 when viewed from below in an oblique direction. FIG. 5 is a planar view of the main-body-side piping attachment portion 30. FIG. 6 is a cross-sectional view along an A-A line of the main-body-side piping attachment portion 30 illustrated in FIG. 5. FIG. 7 is a diagram illustrating the state in which the acoustic coupler rubber 40 is attached to the main-body-side piping attachment portion 30. The acoustic coupler rubber 40 is an elastic rubber functioning as an acoustic coupler for ensuring acoustic coupling of the transmission-reception surfaces of the ultrasonic transducers 5 and 6 with the piping 100. A related-art acoustic coupler rubber has a three-dimensional structure covering the wedges of the ultrasonic transducers. In contrast, in the present embodiment, the acoustic coupler rubber 40 has a flat-plate structure.

As illustrated in FIGS. 4 to 7, in the main-body-side piping attachment portion 30, six screw positioning holes 34 are formed for the purpose of positioning of screws 33 that are used in attaching the main-body-side piping attachment portion 30 to the device main body 10; and four screw holes 31a are formed on four flanges 31 for the purpose of clamping the outer-side piping attachment portion 20 to the piping 100 using screws 23. Moreover, a piping positioning recess 32 is formed at the end portion in the ±Y direction.

In the central part of the main-body-side piping attachment portion 30, an opening 36 is formed through which the ultrasonic transmission-reception surfaces of the ultrasonic transducers 5 and 6 protrude in the −Z direction. Moreover, around the opening 36, four claws 35 are erected toward the −Z direction. Herein, the protrusion of the ultrasonic transmission-reception surfaces in the −Z direction at the opening 36 matches with the thickness of the opening 36. The leading-end bent portion of the claws 35 is oriented in the ±X direction.

In the acoustic coupler rubber 40, four engagement holes 41 are formed at the positions corresponding to the claws 35. The leading-end bent positions of the claws 35 correspond to the thickness of the acoustic coupler rubber 40. When the claws 35 engage in the engagement holes 41, the acoustic coupler rubber 40 gets attached to the main-body-side piping attachment portion 30. In that case, the acoustic coupler rubber 40 abuts against the ultrasonic transmission-reception surfaces of the ultrasonic transducers 5 and 6. Moreover, due to the clamping to the piping 100, the acoustic coupler rubber 40 adheres tightly to the ultrasonic transmission-reception surfaces of the ultrasonic transducers 5 and 6.

More particularly, regarding the attachment of the acoustic coupler rubber 40, for example, the two claws 35 in the +X direction are engaged in the two engagement holes 41 formed in the +X direction of the acoustic coupler rubber 40 and, while stretching the acoustic coupler rubber 40 in the −X direction, the two claws 35 in the −X direction are engaged in the two engagement holes 41 formed in the −X direction of the acoustic coupler rubber 40. As a result, the acoustic coupler rubber 40 abuts against the ultrasonic transmission-reception surfaces of the ultrasonic transducers 5 and 6.

In the present embodiment, because of the flat-plate structure of the acoustic coupler rubber 40, it is easy to control the surface roughness and the vulcanization condition. Moreover, since molding is not used, unevenness does not easily occur in the material, thereby making it possible to ensure excellent acoustical properties. Moreover, as a result of not using molding, the cost can also be held down. Furthermore, in addition to having a flat-plate structure and being easy to handle, the acoustic coupler rubber 40 is also attachable just by engaging the claws 35 in the engagement holes 41. As a result, attachment and detachment of the acoustic coupler rubber 40 becomes easier.

Opening of Outer-Side Piping Attachment Portion

Figure 8A:
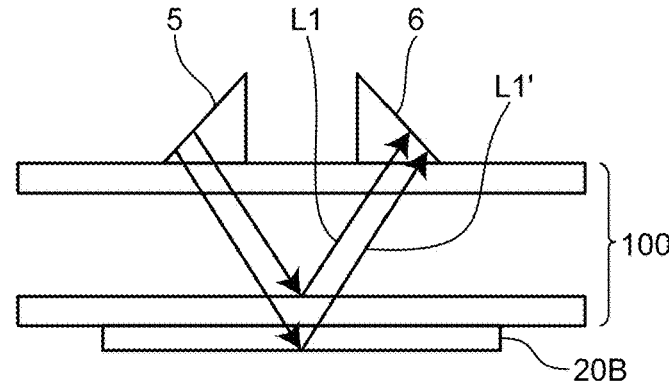
FIG. 8A is a diagram for explaining the manner of reflection of ultrasonic signals depending on the presence or absence of an opening.

If the piping 100 is made of resin, then the ultrasonic signals reflect also from the outer-side piping attachment portion 20. In that regard, as illustrated in FIG. 8A, an ultrasonic signal formed as a result of superimposition of the ultrasonic signal L1, which is reflected from the piping 100, and an ultrasonic signal L1', which is reflected from the outer-side piping attachment portion 20, reaches the ultrasonic transducer 6. That leads to a decline in the accuracy of the flow velocity measurement.

Figure 8B:
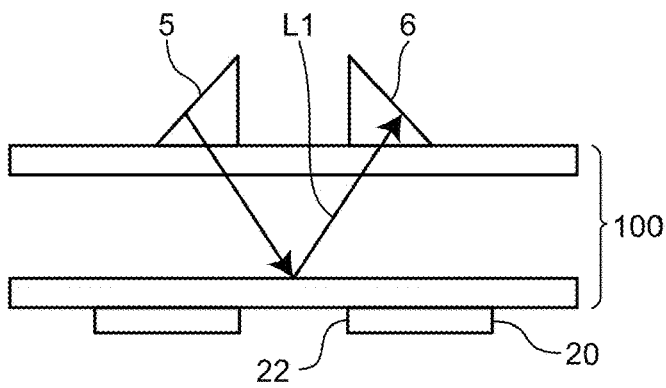
FIG. 8B is another diagram for explaining the manner of reflection of ultrasonic signals depending on the presence or absence of an opening.

In that regard, in the present embodiment, an opening 22 is formed in the reflection portion of the outer-side piping attachment portion 20 from which the ultrasonic signals reflect (see FIG. 2). The opening 22 is U-shaped in accordance with the shape of the piping, and is formed in a piping abutment portion 21 that makes contact with and gets clamped to the piping 100. As a result, as illustrated in FIG. 8B, the ultrasonic signal L1' reflecting from the outer-side piping attachment portion 20 disappears, and only the ultrasonic signal L1 reflecting from the piping 100 is received by the ultrasonic transducer 6. That enables achieving enhancement in the accuracy of the flow rate measurement. Meanwhile, the opening 22 can have an arbitrary shape and it serves the purpose as long as the position of reflection of the ultrasonic signals is left open.

Ultrasonic Transducer

In the related art, when a piezoelectric device is to be attached to the wedge of an ultrasonic transducer, an adhesive agent is used. In such an adhesion structure, heat stress is generated due to low temperatures and high temperatures, because of which sometimes the adhesion comes off. For that reason, it is possible to think of attaching the piezoelectric device to the tilted surface of the wedge using an acoustic grease. However, as a result of using an acoustic grease for attachment, the vibrations or the shocks occurring after completing the assembly cause a shift in the position of the piezoelectric device, and the transmission-reception properties of the ultrasonic waves undergo a decline.

Figure 9:
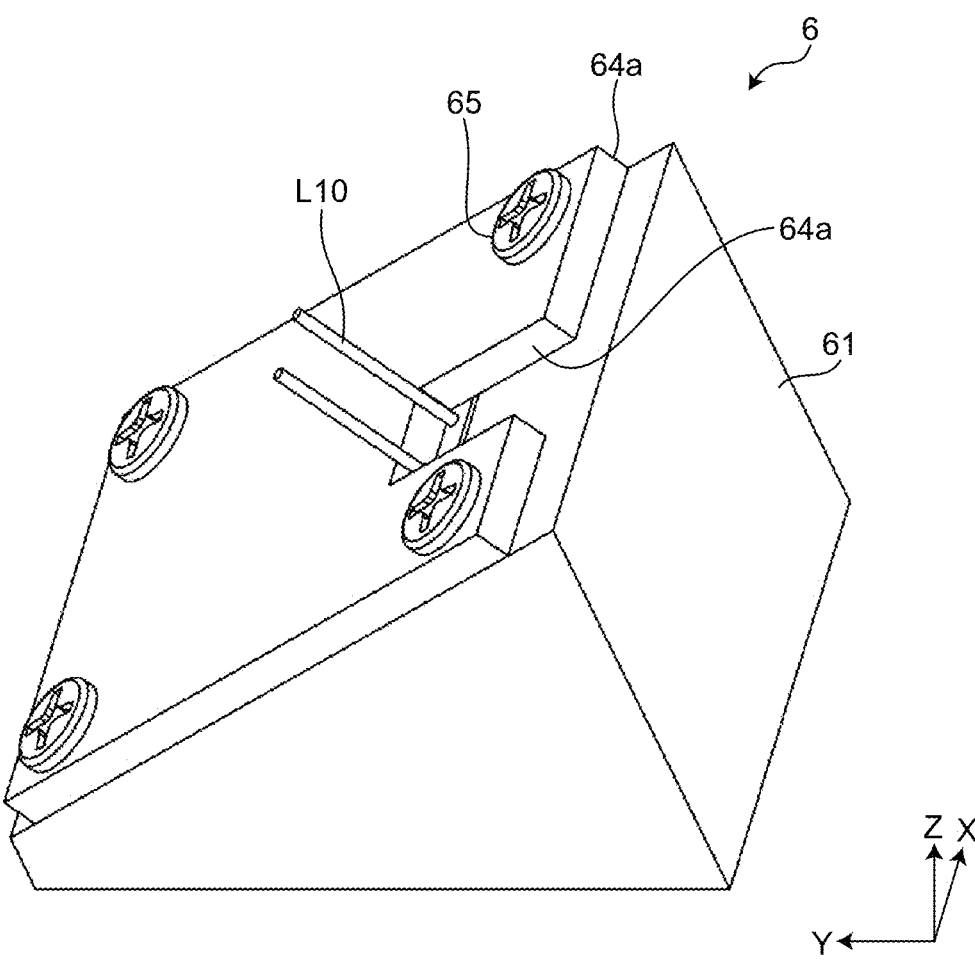
FIG. 9 is a front view of an ultrasonic transducer.
Figure 10:
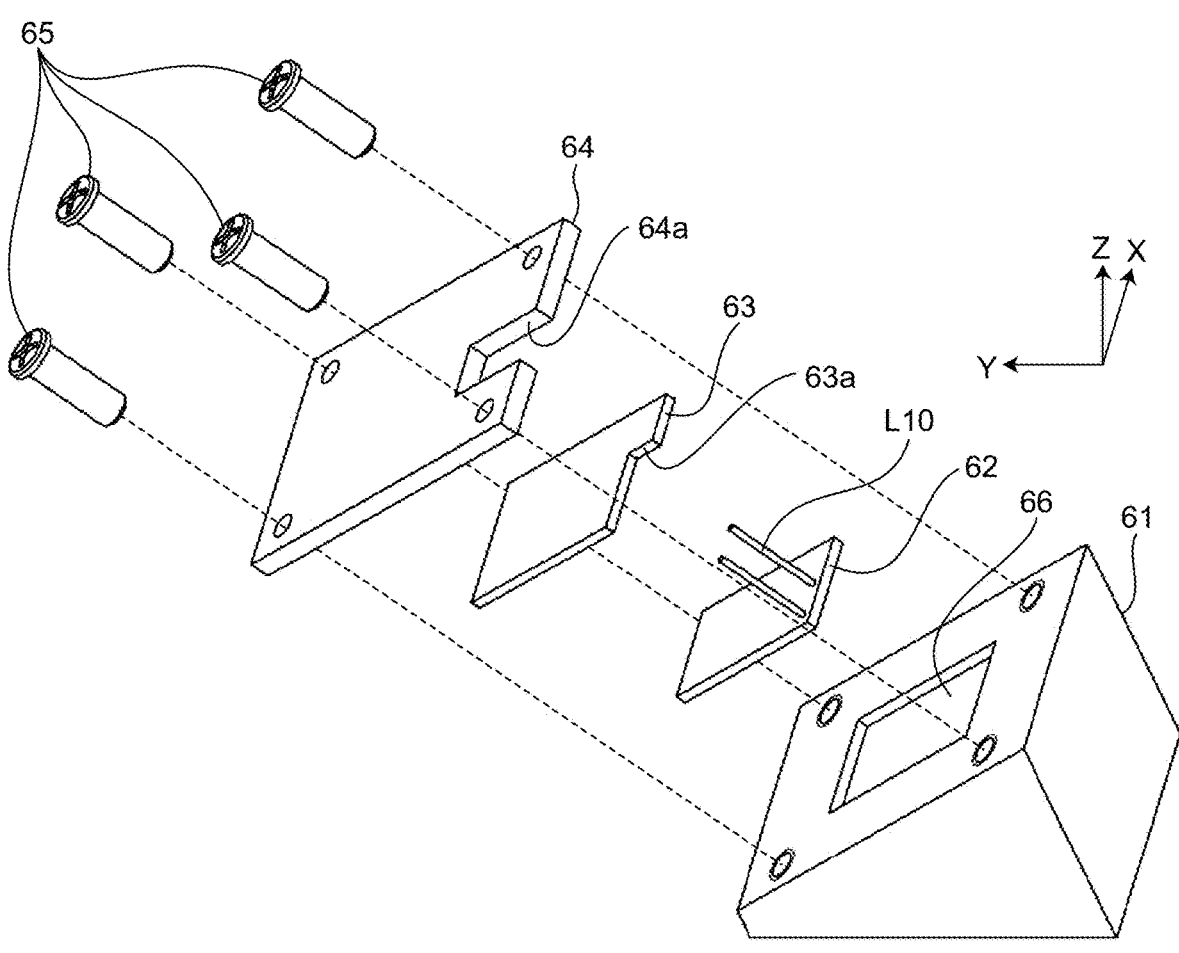
FIG. 10 is an exploded perspective view of the ultrasonic transducer.
Figure 11:
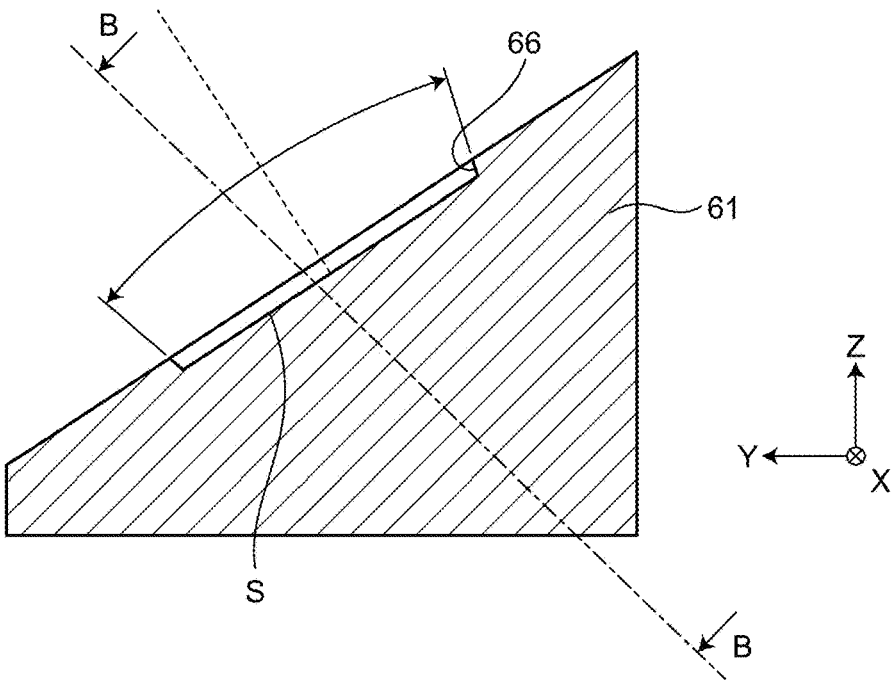
FIG. 11 is a vertical cross-sectional view of a wedge of the ultrasonic transducer.
Figure 12:
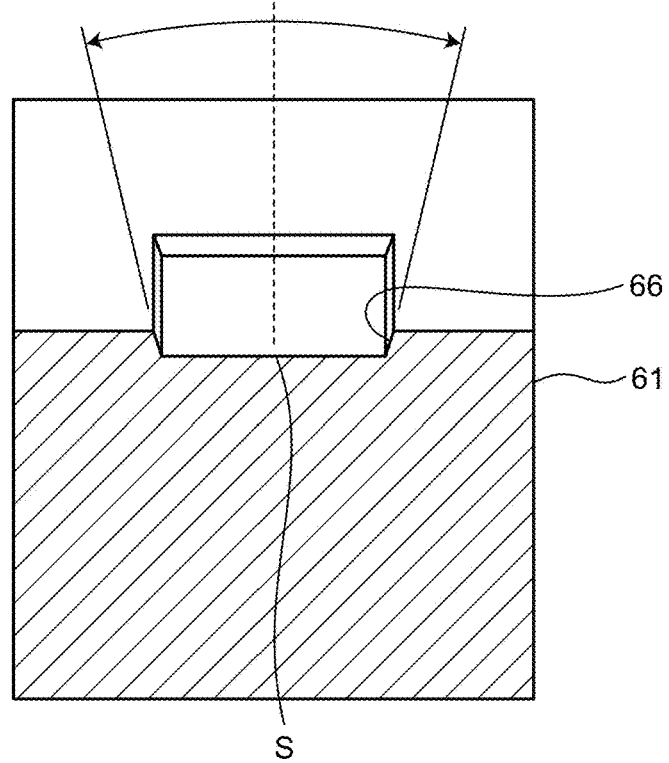
FIG. 12 is a cross-sectional view along a B-B line of the wedge of the ultrasonic transducer illustrated in FIG. 11.

FIG. 9 is a front view of the ultrasonic transducer 6. FIG. 10 is an exploded perspective view of the ultrasonic transducer 6. FIG. 11 is a vertical cross-sectional view of the ultrasonic transducer 6. FIG. 12 is a cross-sectional view along a B-B line of the ultrasonic transducer 6 illustrated in FIG. 11.

As illustrated in FIGS. 9 to 12, in the ultrasonic transducer 6, on the tilted surface of the wedge 61 on which the piezoelectric device 62 is attached, a positioning recess 66 is formed for the purpose of positioning the piezoelectric device 62. The positioning recess 66 has a depression formed in a corresponding manner to the shape of the piezoelectric device 62, thereby enabling positioning of the piezoelectric device 62 at the setting position on the tilted surface of the wedge 61. The attachment surface of the piezoelectric device 62 has an acoustic grease applied thereon and is placed in the positioning recess 66. In case the acoustic grease applied on the attachment surface of the piezoelectric device 62 spills over, it is wiped off.

The side surfaces of the positioning recess 66 have a tilt expanding toward the outer periphery. More particularly, as illustrated in FIGS. 11 and 12, the side surfaces of the positioning recess 66 are tilted toward the outer periphery with respect to the plane perpendicular to a bottom surface S of the positioning recess 66. For that reason, the side surfaces of the piezoelectric device 62 do not come in contact with the wedge 61, and there is no decline in the vibrational property of the piezoelectric device 62. However, since the piezoelectric device 62 is attached to the wedge 61 using the acoustic grease, there is a possibility of a shift occurring in the position of the piezoelectric device 62. Hence, on the back surface of the piezoelectric device 62, a back-surface layer member 63 such as a sponge is placed that represents a back-surface layer having a cushioning function. Thus, via the back-surface layer member 63, the piezoelectric device 62 is restrained using a holder

64. The holder 64 is attached to the wedge 61 using screws 65, because of which the piezoelectric device 62 gets fixed to the positioning recess 66.

Meanwhile, in a corresponding manner to the position of a lead wire L10 of the piezoelectric device 62, a notch 63a is formed on the back-surface layer member 63 and a notch 64a is formed on the holder 64. Meanwhile, although the explanation herein is given about the ultrasonic transducer 6, the same explanation is also applicable to the ultrasonic transducer 5.

In the present embodiment, since the piezoelectric devices are not bonded using an adhesive agent, there is no risk of the adhesion coming off, and the piezoelectric devices can be positioned using positioning recesses while maintaining the acoustical properties on account of using an acoustic grease. Moreover, since the piezoelectric devices are fixed using holders, there is no subsequent shift in the positions of the piezoelectric devices. Furthermore, since the side surfaces of the positioning recesses have a tilt expanding toward the outer periphery, the vibrational property of the piezoelectric devices also does not deteriorate. Meanwhile, in the present embodiment, although an acoustic grease is used, it is also possible to use an adhesive agent.

Moreover, in the embodiment described above, the ultrasonic transducers 5 and 6 are disposed in the same device main body 10. However, alternatively, within the scope of application, the ultrasonic transducers 5 and 6 can be separated from each other and can be placed opposite to each other via a piping, and then the flow rate can be measured.

The present disclosure is not limited to the embodiment described above, and it goes without saying that modifications can be freely made without departing from the scope of the present disclosure.

According to the present disclosure, it is possible to provide a clamp-on type ultrasonic flowmeter in which such an acoustic coupler rubber is disposed which enables maintaining excellent acoustic properties and at the same time enables holding down the molding cost.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A clamp-on type ultrasonic flowmeter, using ultrasonic waves for measuring a flow rate of a fluid flowing inside a piping, comprises an acoustic coupler rubber with a flat-plate structure, which is attached to an ultrasonic transmission-reception surface of an ultrasonic transducer that transmits ultrasonic waves to and receives ultrasonic waves from the piping, pipe positioning recesses formed at end portions of a main-body-side piping attachment portion mounted on a device main body, and configured to prevent the piping from deviating or tilting from its proper mounting position, wherein the thickness of the acoustic coupler rubber with the flat-plate structure matches the protrusion of the ultrasonic transmission-reception surface, and the acoustic coupler rubber is tightly abutted against the ultrasonic transmission-reception surface by means of a clamping force generated when the flowmeter is clamped to the piping.

2. The clamp-on type ultrasonic flowmeter according to claim 1, wherein on side of the device main body on which the ultrasonic transmission-reception surface is formed, a plurality of claws is erected around the ultrasonic transmission-reception surface, on the acoustic coupler rubber, engagement holes are formed at positions corresponding to positions of the claws, and when the claws engage in the engagement holes, the acoustic coupler rubber abuts against the ultrasonic transmission-reception surface.

3. The clamp-on type ultrasonic flowmeter according to claim 1, wherein clamping to the piping is done using the device main body on which the ultrasonic transmission-reception surface is formed, and an outer-side piping attachment portion that is present on side of reflection of ultrasonic waves transmitted from the ultrasonic transmission-reception surface, and in the outer-side piping attachment portion, an opening is formed in reflection portion of an ultrasonic signal.

\* \* \* \* \*